US011451162B2

(12) United States Patent
Jankee et al.

(10) Patent No.: US 11,451,162 B2
(45) Date of Patent: Sep. 20, 2022

(54) METHOD FOR CONTROLLING AN ASSEMBLY OF INVERTERS IN AN ELECTRICITY GENERATION SYSTEM WITH PARALLEL INVERTERS

(71) Applicant: SAFRAN ELECTRICAL & POWER, Blagnac (FR)

(72) Inventors: Ashvin Jankee, Moissy-Cramayel (FR); Guillaume Capron, Moissy-Cramayel (FR); Frédéric Pailhoux, Moissy-Cramayel (FR); Pascal Morin, Moissy-Cramayel (FR); Sonia Dhokkar, Moissy-Cramayel (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 9 days.

(21) Appl. No.: 17/282,217

(22) PCT Filed: Sep. 30, 2019

(86) PCT No.: PCT/FR2019/052301
§ 371 (c)(1),
(2) Date: Apr. 1, 2021

(87) PCT Pub. No.: WO2020/070421
PCT Pub. Date: Apr. 9, 2020

(65) Prior Publication Data
US 2021/0344280 A1 Nov. 4, 2021

(30) Foreign Application Priority Data
Oct. 4, 2018 (FR) ...................... 1859214

(51) Int. Cl.
H02M 7/493 (2007.01)
H02M 1/00 (2006.01)
H02M 7/5387 (2007.01)

(52) U.S. Cl.
CPC ....... H02M 7/493 (2013.01); H02M 7/53871 (2013.01); H02M 1/0074 (2021.05); H02M 1/0077 (2021.05)

(58) Field of Classification Search
CPC .. H02M 1/0074; H02M 1/0077; H02M 5/458; H02M 7/5381; H02M 7/5395; H02M 7/493
See application file for complete search history.

(56) References Cited

U.S. PATENT DOCUMENTS

| 8,624,439 B2 * | 1/2014 | Marcianesi | H02M 7/493 363/71 |
| 2012/0049782 A1 * | 3/2012 | Suzuki | H02P 25/22 318/807 |

(Continued)

FOREIGN PATENT DOCUMENTS

| CN | 104660059 A | * 5/2015 | .......... H02M 3/1584 |
| EP | 2950440 A1 | * 12/2015 | ............ H02M 7/493 |

(Continued)

OTHER PUBLICATIONS

French Preliminary Search Report and Written Opinion for French Application No. 1859214, dated May 23, 2019.

(Continued)

Primary Examiner — Gary A Nash
(74) Attorney, Agent, or Firm — Birch, Stewart, Kolasch & Birch, LLP

(57) ABSTRACT

The invention concerns a method for controlling an assembly of at least two inverters (1a, 1b) in an electricity generating system with parallel inverters. The method comprises the implementation by at least one data processing unit (2a, 2b) of the steps: (a) for each inverter (1a, 1b) of the assembly, obtaining an input duty factor (PWMi) of an input signal (Si) received by the inverter (1a, 1b), (b) calculating a mean duty factor (PWMm) from the input duty factors (Continued)

(PWMi), (c) modulating and synchronising the input signal (Si) received by each inverter (1*a*, 1*b*) into an output signal (So) having an output duty factor (PWMo) corresponding to the mean duty factor (PWMm).

10 Claims, 4 Drawing Sheets

(56) References Cited

U.S. PATENT DOCUMENTS

| | | |
|---|---|---|
| 2014/0203756 A1 | 7/2014 | Kajiura et al. |
| 2016/0190972 A1* | 6/2016 | Mori .................. H02P 21/22 318/490 |
| 2016/0211771 A1* | 7/2016 | Ichihara ................. H02M 1/08 |
| 2016/0329705 A1* | 11/2016 | Lacaux ................. H02M 1/126 |
| 2016/0380437 A1* | 12/2016 | Casimir ................. H02M 7/06 307/9.1 |

FOREIGN PATENT DOCUMENTS

| | | |
|---|---|---|
| JP | 4-33573 A | 2/1992 |
| JP | 2017-139938 A | 8/2017 |

OTHER PUBLICATIONS

International Search Report and Written Opinion of the International Searching Authority for International Application No. PCT/FR2019/052301, dated Jan. 28, 2020.

* cited by examiner

Fig. 2
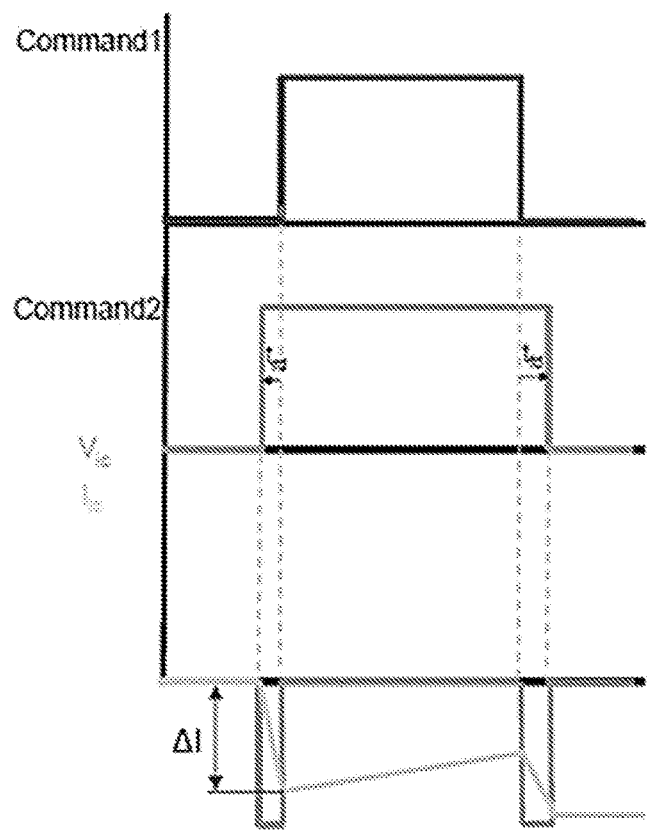
$$\Delta Ih_s = \frac{V_{B1B2}}{2 \cdot L_{Lconnection}} \cdot t_{shift}$$
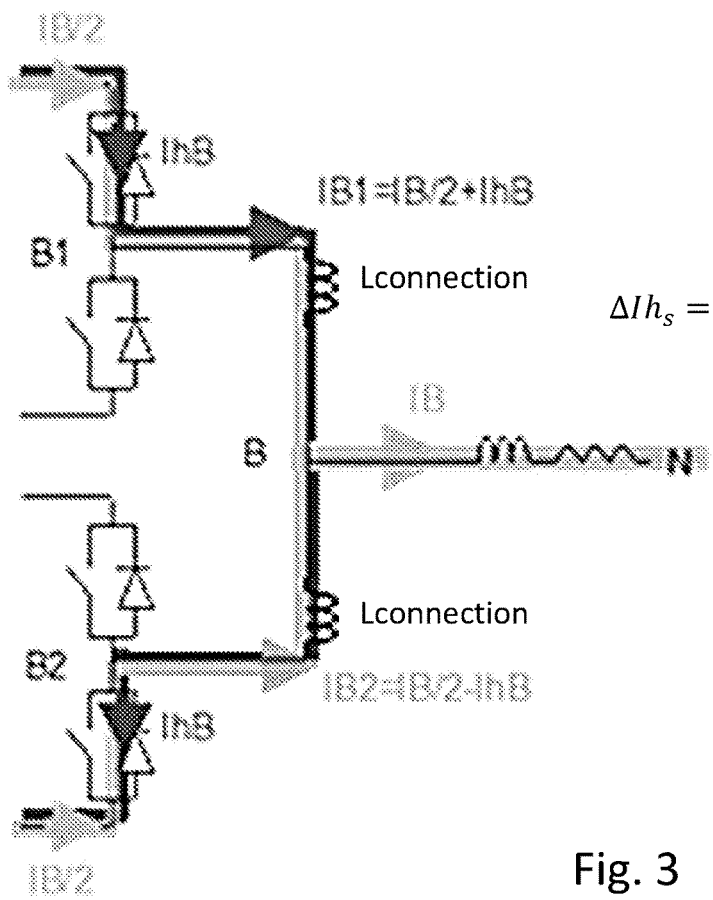
Fig. 3

METHOD FOR CONTROLLING AN ASSEMBLY OF INVERTERS IN AN ELECTRICITY GENERATION SYSTEM WITH PARALLEL INVERTERS

FIELD OF THE INVENTION AND STATE OF THE ART

The present invention relates to a method for controlling a set of inverters in an electrical generation system with parallel inverters.

In the aeronautical field, it is known to have a synchronous three-phase generator supplied by each engine of an aircraft. Inverters allow converting the direct current (DC) into alternating current (AC) to drive a load (electric motor, heating, etc.). These inverters can be single-phase or multiphase inverters. In a traditional way, several parallel inverters are used in synchronous mode (as represented in FIG. 1). These inverters have therefore output inductances connected to each other. However, in operation, any difference in the duty cycle of the current provided by each inverter or in the synchronization between inverters results in a circulating current between the inverters. These circulating currents cause shifts in the currents derived from the inverters, as represented in FIG. 2. To reduce these currents, it is known to add output inductances, as can be seen in FIG. 3. The more the inductance added will be large, the more the circulating currents will be reduced. However, the addition of an output inductance increases the mass of the system. However, it is well known that the mass is a limiting factor in aeronautics. This solution is therefore not satisfactory.

Consequently, it is necessary to provide a method for controlling a set of inverters, in an electrical generation system with parallel inverters, which allows having a stable output signal, without shift, without increasing the mass of the embedded elements.

General Presentation of the Invention

According to a first aspect, the invention relates to a method for controlling a set of at least two inverters in an electrical generation system with parallel inverters. The method comprises the implementation, by at least one data processing unit, of steps of:

(a) obtaining, for each inverter of said set, an input duty cycle of an input signal received by said inverter, (b) calculating an average duty cycle from the input duty cycles, (c) modulating and synchronizing the input signal received by each inverter into an output signal having an output duty cycle corresponding to the average duty cycle.

In a particularly advantageous manner, the calculation of the average duty cycle of the set of the input duty cycles and the use of this average duty cycle to modulate the output signal allows having the same stable signal emitted by all the inverters. In other words, the method according to the invention allows having a redundant (and therefore secure) system in which the inverters all emit the same synchronized output signal, thus avoiding the phase shift problems and thus allowing dispensing with the addition of extra coils to the output of the inverters, which allows saving mass.

According to a preferred embodiment, each inverter of said set can comprise a dedicated data processing unit, step (a) being implemented by a plurality of said dedicated data processing units.

According to a particularly preferred embodiment, step (a) can comprise the reception by each inverter of the set of the input duty cycles of the signals received by the set of the inverters.

This disposition allows having a robust and redundant system in which the information is shared. In other words, this disposition allows multiplying the exchanges of information to avoid a generalized failure in the event of failure of an inverter.

Step (a) can comprise the determination by each of said plurality of data processing units of said input duty cycle of the input signal received by its inverter.

Step (b) can be implemented independently by each data processing unit implementing step (a).

Each inverter can comprise a modulation unit, step (c) comprising for each inverter of said set the sending to the modulation unit of said inverter of a modulation control.

Step (c) can be implemented independently by each data processing unit.

Step (c) can be carried out by generating a rectangular signal at a determined frequency where a time at a high state of the signal relative to a period of the signal corresponds to a value of the output duty cycle.

According to a second aspect, the invention relates to a set of parallel inverters in an electrical generation system controlled according to a method according to the invention.

The inverter can comprise a data processing unit, a communication unit and a modulation unit.

The data processing unit can be adapted to implement step (b).

The communication unit can be adapted to implement step (a) of the method, to transmit the input duty cycle obtained by the inverter and to receive the input duty cycles obtained by other inverters.

The modulation unit can be adapted to implement step (c).

According to a third aspect, the invention relates to a computer program product comprising code instructions for the execution of a method for controlling a set of inverters according to the invention, when said program is executed on a computer, an automaton, or a programmable logic circuit.

According to a fourth aspect, the invention relates to a storage means readable by computer equipment on which a computer program product comprises code instructions for the execution of a method for controlling a set of inverters according to the invention.

DESCRIPTION OF THE FIGURES

Other characteristics and advantages of the invention will emerge from the following description, which is purely illustrative and not restrictive, and should be read with reference to the appended figures in which:

FIG. 2 is a graph of the phases of the signals at the output of the system of FIG. 1;

FIG. 3 completes FIG. 2 by showing the circulation of the currents on a wiring diagram;

DETAILED DESCRIPTION OF THE INVENTION

Figure 1:
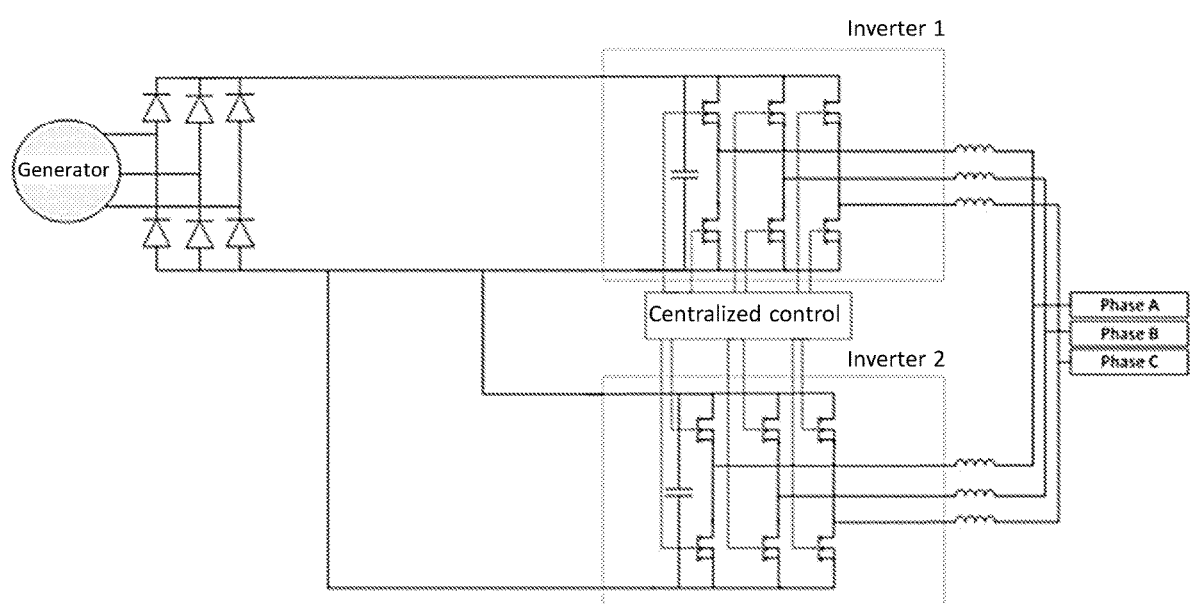
FIG. 1 is a wiring diagram of a known system.
Figure 4:
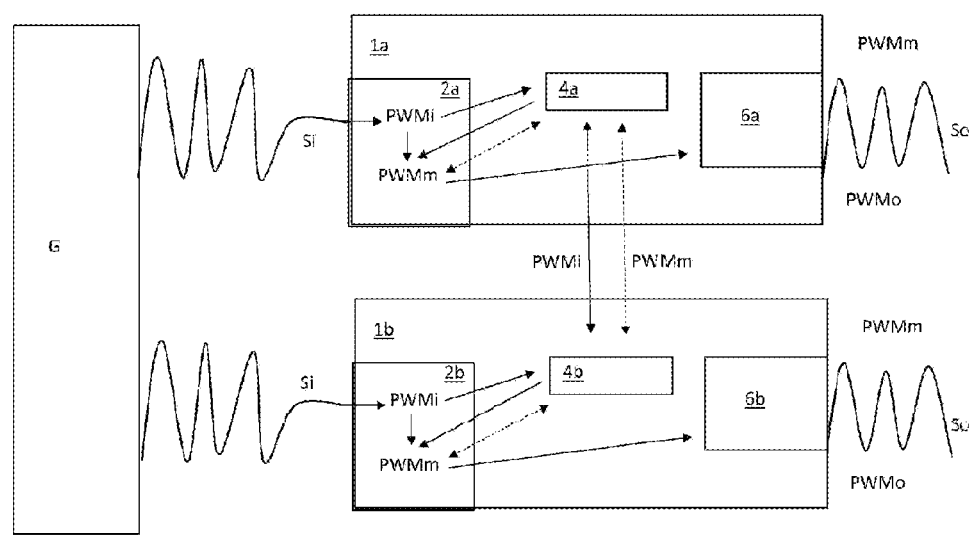
FIG. 4 is a block diagram of a set of parallel inverters controlled according to a method according to the invention.
Figure 5:
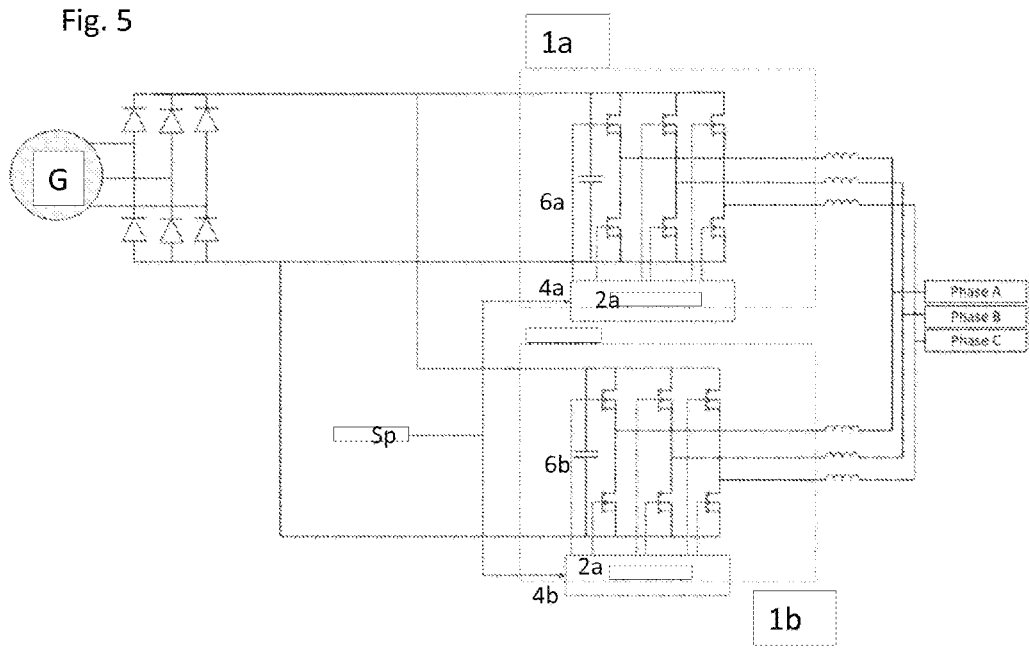
FIG. 5 is a wiring diagram of a set of inverters according to the invention.

The invention relates to a set of inverters $1a$, $1b$ and a method for controlling a set of inverters $1a$, $1b$ in an electrical generation system with parallel inverters.

It is specified for convenience that the following description is made with two inverters 1a and 1b, but the invention is in no way limited to two inverters 1a, 1b. It is possible to implement the invention with three, four or as many inverters as desired.

Inverter

The inverter 1a, 1b mainly comprises a processing unit 2a, 2b, a communication unit 4a, 4b and a modulation unit 6a, 6b.

The inverter 1a, 1b consists of digital electronics comprising a control part and an electronic power part.

The control part integrates the processing unit 2a, 2b and the communication unit 4a, 4b. The control part can be completely integrated into the inverter 1a, 1b or partially offset outside the inverter 1a, 1b.

The electronic power part integrates the modulation unit 6a, 6b.

According to the embodiment presented here, a programmable logic circuit of the "field-programmable gate array" (FPGA) type integrates the control part, that is to say, the processing 2a, 2b, and communication 4a, 4b units.

The processing unit 2a, 2b communicates, via the communication unit 4a, 4b, with the outside to receive the local duty cycles and send health data of the inverter. In addition, the processing unit, 2a, 2b performs the averaging of the duty cycles received from the other inverters 1a, 1b.

The communication unit 4a, 4b is based on multipoint buses (1 to n), i.e. n buses to parallelize n inverters 1a, 1b.

According to the embodiment presented here, the modulation unit 6a, 6b generates output signals So according to what is requested by the processing unit 2a, 2b by using a carrier signal Sp which is compared to the average duty cycle PWMm requested. The carrier signal Sp is synchronized by an external signal allowing the modulation units 6a, 6b of the different inverters 1a, 1b to generate the same signals So (following the averaging) at the same instant (synchronization). These signals So having a duty cycle PWMo control power transistors to generate output currents of each inverter 1a, 1b. The modification of the duty cycles thus allows modulating the output signal So.

In operation, in general, each inverter 1a, 1b receives an input signal Si representing an input duty cycle PWMi. The data processing unit 2a, 2b knows how to determine the input duty cycle PWMi. The inverter 1a, 1b can modulate the input signal Si received by imposing an output duty cycle PWMo. The output duty cycle PWMo is determined or recorded or received by the data processing unit 2a, 2b. The data processing unit 2a, 2b then instructs the modulation unit 6a, 6b to modulate the received input signal Si so that an output signal So of the inverter 1a, 1b has the desired output duty cycle PWMo.

It is specified that in the case where the output duty cycle PWMo is sent to the data processing unit 2a, 2b, this is done via the communication unit 4a, 4b.

In addition, as will be developed below, the communication unit 4a, 4b can also be used for the exchange of information between several inverters 1a, 1b. This exchanged information can be, for example, the input duty cycles PWMi of each inverter 1a, 1b.

The inverter 1a, 1b is adapted to be controlled according to the method described below.

It is specified that the inverter 1a, 1b can be multi-phase inverter, in this case, the control method (presented below) operates on the total number of phases of the inverter 1a, 1b.

Control Method

The invention relates to a method for controlling a set of inverters 1a, 1b in an electrical generation system with parallel inverters.

The method comprises the steps of:

(a) obtaining, for each inverter 1a, 1b of said set, an input duty cycle PWMi of an input signal Si received by said inverter 1a, 1b, (b) calculating an average duty cycle PWMm from the input duty cycles PWMi, (c) modulating and synchronizing the input signal Si received by each inverter 1a, 1b into an output signal So having an output duty cycle PWMo corresponding to the average duty cycle PWMm, According to a first embodiment, the method uses an outer processing unit 2a, 2b, which receives from each inverter 1a, 1b its input duty cycle PWMi (step (a)), transmitted via the communication unit 4a, 4b.

Typically, the outer processing unit 2a, 2b can be a computer, an automaton or a programmable logic circuit comprising communication means and at least one processor or (and) a function performed in wired logic. According to this embodiment, step (b) is carried out by the outer processing unit which receives all the input duty cycles PWMi, accordingly determines an average duty cycle PWMm by calculating the average value thereof. This average duty cycle PWMm is then transmitted to the inverters 1a, 1b via their communication units 4a, 4b. Then, the data processing units 2a and 2b of each inverter 1a, 1b instruct the modulation units 6a, 6b to modulate the received input signal Si into an output signal So accordingly so that the output duty cycle PWMo is equal to PWMm.

According to a preferred embodiment, the three steps (a), (b) and (c) can be carried out by the units of all or part of the inverters 1a, 1b. Thus, the system is redundant and robust in the event of failure of one or more inverters 1a, 1b.

More particularly, each inverter 1a, 1b receives an input signal Si. The processing unit 2a, 2b determines the corresponding input duty cycle PWMi (step (a)). Then, the communication unit 4a, 4b of each inverter 1a, 1b transmits the input duty cycle PWMi to the other inverters 1 (step (a)). Thus, each communication unit 4a, 4b transmits the input duty cycle PWMi by its inverter 1a or 1b and receives the input duty cycle PWMi from the other inverters 1a or 1b (step (a)). All the input duty cycles PWMi are transmitted to the processing unit 2a, 2b of each inverter 1a, 1b (step (a)). Then, each processing unit 2a, 2b calculates the average duty cycle PWMm which corresponds to the average of the input duty cycles PWMi (step (b)). The average duty cycle PWMm is then transmitted to the modulation unit 6a, 6b. Then, the modulation unit 6a, 6b modulates the received input signal Si according to the average duty cycle PWMm (step (c)) so that the output duty cycle PWMo is equal to the average duty cycle PWMm. In a particularly advantageous manner, each inverter 1a, 1b then emits the same output signal So having the same average duty cycle PWMm. Thus, the set of output signals So emitted by the inverters 1a, 1b are synchronized so that there is no shift between them.

It is possible to add an extra step of comparing the average duty cycles PWMm determined by each inverter 1a, 1b. This checking step can be carried out by a mutual exchange such as the one operated for the input duty cycles PWMi. According to another disposition, this step can be entrusted to a single inverter 1a, 1b established as a trusted inverter 1a, 1b which centralizes all the determined average duty cycles PWMm and compares them with its own average duty cycle PWMm. According to yet another disposition, the checking and comparison of the average duty cycles PWMm can be carried out by an outer processing unit.

Computer Program Product

According to a third aspect, the invention relates to a computer program product comprising code instructions for the execution of the method for controlling a set of inverters 1a, 1b according to the invention, when said program is executed on a computer.

It is understood that said computer can be embedded in each inverter 1a, 1b and comprise the data processing units 2a, 2b. Said computer can also comprise communication units 4a, 4b. In this case, said computer may be an electronic card such as a programmable logic circuit or an automaton.

Storage Means

According to a fourth aspect, the invention relates to a storage means readable by computer equipment on which a computer program product comprises instructions for the execution of the method for controlling a set of inverters 1a, 1b according to the invention. It is specified that the storage means can be the internal memory of a processing unit 2a, 2b, of an inverter 1a, 1b.

The invention claimed is:

1. A method for controlling a set of at least two inverters in an electrical generation system with parallel inverters, the method being characterized in that it comprises the implementation, by at least one data processing unit, of steps of:
    (a) obtaining, for each inverter of said set, an input duty cycle of an input signal received by said inverter,
    (b) calculating an average duty cycle from the input duty cycle,
    (c) modulating and synchronizing the input signal received by each inverter into an output signal having an output duty cycle corresponding to the average duty cycle.

2. The method according to claim 1, wherein each inverter of said set comprises a dedicated data processing unit step (a) being implemented by a plurality of said dedicated data processing units.

3. The method according to claim 2, wherein step (a) comprises the reception by each inverter of the set of the input duty cycles of the input signals received by the set of the inverters.

4. The method according to claim 2, wherein step (a) comprises the determination by each of said plurality of data processing units of said input duty cycle of the input signal received by its inverter.

5. The method according to claim 2, wherein step (b) is implemented independently by each data processing unit implementing step (a).

6. The method according to claim 5, wherein each inverter comprises a modulation unit, step (c) comprising for each inverter of said set the sending to the modulation unit of said inverter of a modulation control, and wherein step (c) is implemented independently by each data processing unit.

7. The method according to claim 1, wherein each inverter comprises a modulation unit, step (c) comprising for each inverter of said set the sending to the modulation unit of said inverter of a modulation control.

8. The method according to claim 1, wherein step (c) is carried out by generating a rectangular signal at a determined frequency where the time at the high state of the signal relative to the period of the signal corresponds to the value of the output duty cycle.

9. A set of parallel inverters in an electrical generation system characterized in that said inverters are controlled according to a method according to claim 1.

10. The set of inverters according to claim 9, wherein each inverter comprises a data processing unit, a communication unit and a modulation unit.

* * * * *